Oct. 22, 1940.   C. GROEN   2,218,641
VALVE OPERATING MEANS
Filed July 19, 1939
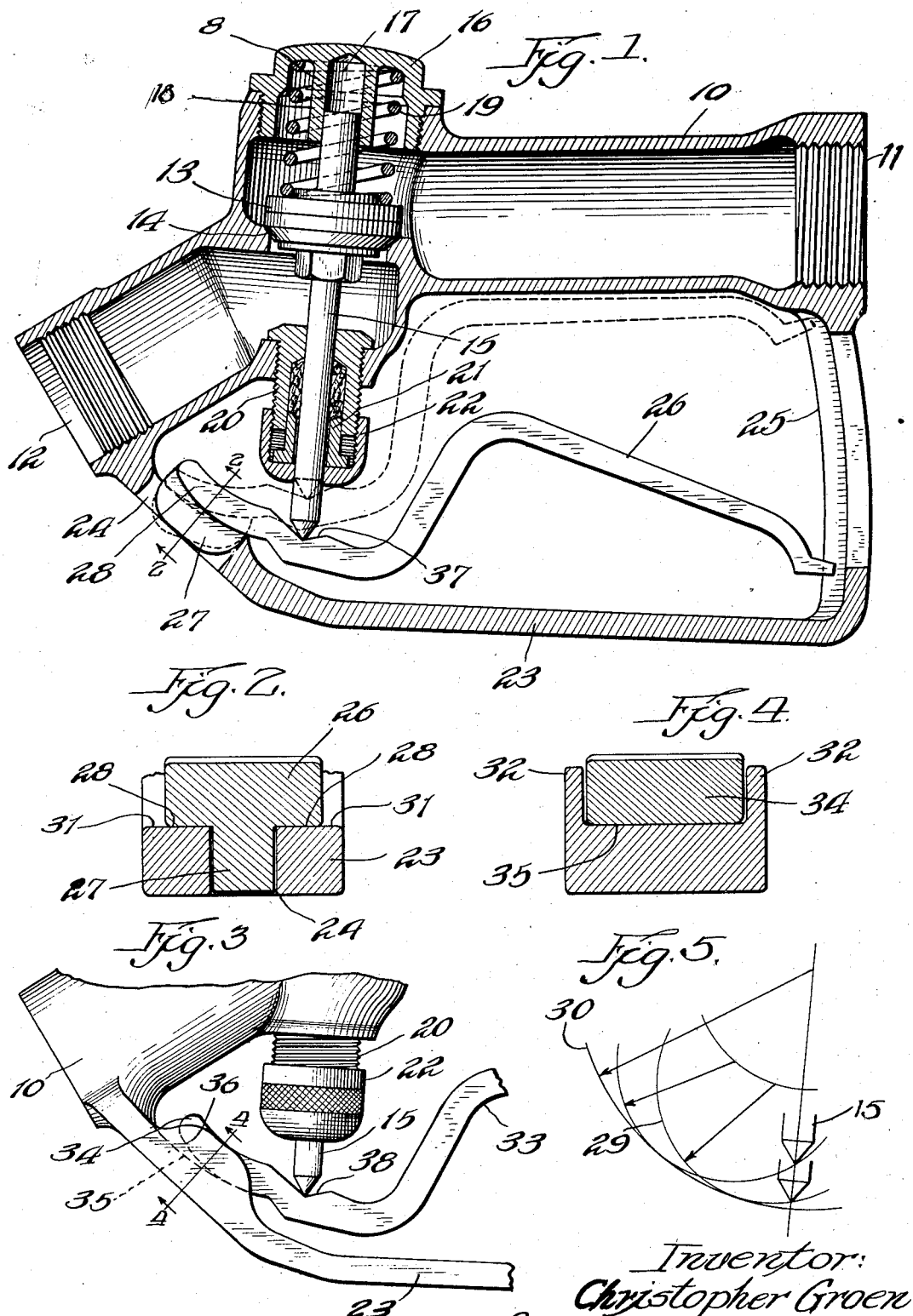
Inventor:
Christopher Groen
By Wilkinson Huxley Byron & Knight
Attys

Patented Oct. 22, 1940

2,218,641

UNITED STATES PATENT OFFICE 2,218,641

VALVE OPERATING MEANS

Christopher Groen, Oak Park, Ill., assignor to A. Y. McDonald Mfg. Co., Dubuque, Iowa, a corporation of Iowa Application July 19, 1939, Serial No. 285,225

8 Claims. (Cl. 251—134)

My invention relates to valve operating means for nozzles. It has particular reference to valve operating means in which the force applied to the valve is in a straight line on the longitudinal axis of the valve stem, thereby preventing all side thrust on the valve stem and doing away with tipping of the valve and unequal wear on the various parts of the valve structure resulting in leakage of the valve through wear.

Another and further object of my invention is the provision of valve operating means for use particularly in connection with nozzles which are applied to the end of a hose used for dispensing purposes with gasoline pumps, gas and oil tanks, and the like, wherein a valve is located with a valve operating handle mounted therein, so that the operator in grasping the nozzle may also grasp the valve operating handle and by force applied through the grip is able to open the valve so that the fluid is discharged from the gasoline dispensing pump, gasoline tank, oil wagon or the like.

In nozzles of this type a valve is used having a projecting stem engaged by a handle to open the valve. Due to various mountings of the handle in the guard usually attached to the nozzle, a side force as well as a thrust on the end of the stem is obtained, causing the valve to tilt in its seat or causing uneven wear on the stem of the valve so that the valve does not seat properly, resulting ultimately in a leaky valve with loss of fluid from the end of the nozzle. If the material is inflammable or combustible, such as gasoline or the like, it may be ignited and destructive fires or an explosion result. In my improved construction I am able to impart a rectilinear movement to the valve stem without side thrust in any direction, so that the valve is seated in a straight line resulting in proper seating of the valve at all times and also in even wear of the valve stem so that an angular or tilted position of the valve is avoided and leakage thereby prevented.

Another and further object of my invention is the provision of a nozzle having a guard with a circular curved seat in which the circular curved valve operating lever end rolls, and by virtue of the position of the center of the circular curved seat being on the line of valve action and the radius of this circular curve being twice that of the circular curve of the valve operating lever end, and further locating the point of contact between operating lever and valve stem on the circular curve of lever end produced, a force is imparted to valve stem by the operating lever in a line coinciding with the valve stem so that all side movement or side thrust of operating lever or valve stem is avoided.

Another and further object of my invention is the provision of a nozzle and valve operating means therefor which can easily and quickly be assembled both in manufacturing the nozzle originally and for repair purposes should such become necessary during the operation of the nozzle, in which a valve operating handle can be easily and quickly inserted.

These and other objects of my invention will be more fully and better understood by reference to the accompanying sheet of drawings, and in which—

Figure 1 is a vertical view, partially in elevation and partially in section, through a nozzle embodying my invention;

Figure 2 is a cross sectional view on line 2—2 of Figure 1;

Figure 3 is a detailed view in elevation of a modified form of holding means for the forward end of the operating handle;

Figure 4 is a sectional view on line 4—4 of Figure 3; and

Figure 5 is a diagrammatic view illustrating the method employed for securing the proper relationship of the bearing surface of the operating lever and the guard therefor.

Referring now specifically to the drawing and in which like reference characters refer to like parts throughout, a nozzle 10 is shown having the usual intake end 11 to which a hose or other connection can be attached, and an internally threaded outlet end 12 to which a discharge spout is customarily secured. A valve 13 is mounted in the nozzle and normally in closed position engages a seat 14 formed in the body of the nozzle. A valve stem 15 passes through the valve 13 and projects at its upper end into a valve cap 16 having a recess 17 formed therein in a truncated portion 18 of the valve cap around which a spring 19 extends. The spring exerts its force in an expansive direction so as to normally force the valve against its seat to retain the valve in closed position. A gland 20 is threaded into the nozzle body and has the lower end of the stem 15 extending therethrough. A packing member 21 is provided which cooperates with a cap 22 in threaded engagement with the gland 20 and which when turned on against the usual packing carried by the gland member 20, forms a tight connection around the valve stem 15.

A guard 23 is provided integrally formed with the nozzle 10 as shown although in practice the guard may be made separately and attached to the nozzle in any approved manner as by screws or the like, and in the preferred form has an opening 24 therein adjacent the discharge end 12 of the nozzle. At the rear end of the guard 23 are flanges 25 adjacent the marginal edges thereof forming a channel therebetween within which the rear end of the valve operating lever 26 is positioned. The forward end of the operating lever 26 in the preferred form has a lug 27 formed thereon which is fitted into the opening 24 formed in the guard 23, thereby preventing sidewise movement of the operating lever 26 and serving with the flanges 25 to hold the operating lever 26 in proper position within the guard 23. The forward end of the lever 26 is formed with curved bearing surfaces 28, 28 on its under side on each side of the lug 27. These curved surfaces 28, 28 conform in contour to the curve of a generating circle 29 developed inside of a directrix circle 30. The radius of the generating circle 29 is one-half the radius of the directrix circle 30. The bearing surfaces 31, 31 on the guard 23, and upon which the surfaces 28, 28 of the lever 26 operate, are the same curvature as the directrix circle 30 as illustrated in Figure 5.

It so happens that in the preferred form of device of a size proper for the nozzle of the ordinary dispensing pump, I prefer to use a directrix circle 30 having a two inch radius, while the generating circle 29 is one-half the radius of the directrix circle 30 and has a one inch radius. The lever 26 functions, therefore, as a lever of the second class with a constantly changing fulcrum during its operation and maintaining a straight line thrust on the valve stem 15.

In Figures 3 and 4 a modified form of the device is illustrated. The guard 23 is shown having projections 32, 32 on each side of an operating lever 33, so that the end 34 of the operating lever is fitted in between the projections 32, 32, preventing sidewise movement or displacement of the operating lever 33. A seat 35 is formed on the guard 23 which has the same curvature as the circle 30, Figure 5, with a seat portion 36 formed on the operating lever 33 of the same curvature as the circle 29, so that the same action results from the operation of the handle in this form as in the form heretofore described. A recess 37 is formed in the lever 26 in the bottom of which the end of the valve stem 21 is seated and which is conical in form, and a recess 38 is formed on the upper side of the handle 33 which also receives the conical end of the valve stem 21, so that a point contact is formed between these members.

In assembling the device of either of the forms illustrated in the drawing, the lever 26 is placed inside of the guard 23, in the form shown in Figure 1, with the projection 27 on the lever 26 fitted into the opening 24 in the guard 23 and the rear end of the lever into the slot 25. The valve asembly is placed in position in the nozzle 10, and the cap 16 screwed down so that the stem 21 projects through the gland 20 and cap 22 and into engagement with the lever 26. The engagement of the end of the valve stem with the lever 26 holds it against displacement in the guard 23 so that the device is easily and quickly assembled.

In the forms of device shown in Figures 3 and 4, the above described operation takes place with the exception that the lever 33 is first placed in position with the rear end projecting into the slot 25 and the front end lying between the projections 32, 32 on the guard 23. The valve stem is then placed in position in the guard and the lever 33 held in operative position by the valve stem regardless of whether the valve is in open or closed position.

The operation of the device will be readily and quickly understood in that as hereinabove described, the valve operating lever becomes a lever of the second class, with a constantly changing fulcrum point between the curved bearing surfaces and the end of the operating lever. Due to the curvature of these cooperating surfaces a straight line thrust is always produced on the end of the valve stem 15 so that side wear is eliminated, proper seating of the valve is always obtained preventing leakage, and long life and easy operation of the device is insured.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. In combination with a nozzle, a valve in said nozzle having a stem extending outside of said nozzle, a guard on said nozzle, and a valve operating lever carried by the said guard having a curved fulcrum seat on one end thereof, the said guard having a cooperating curved seat for the reception of the said operating lever, the curved surface on the guard being approximately twice the radius of the curvature of the seat on the said lever.

2. In combination with a nozzle, a valve in said nozzle having a stem extending outside of said nozzle, a guard on said nozzle, and a valve operating lever carried by the said guard having a curved fulcrum seat on one end thereof, the said guard having a cooperating curved seat for the reception of the said operating lever, the curved surface on the guard being approximately twice the radius of the curvature of the seat on the said lever, the said bearing surfaces causing any point on the curved fulcrum seat of the operating lever to describe a hypocycloid.

3. In combination with a nozzle, a valve in said nozzle having a stem extending out of the nozzle, a guard on said nozzle having an opening near one of its ends and a channel at the opposite end, and a valve operating lever having a projection on its under side extending into the opening in the guard, the other end of the valve operating lever extending into the channel whereby the operating lever is held in operative position with respect to said valve stem.

4. In combination with a nozzle a valve in said nozzle having a stem extending out of the nozzle, a guard on said nozzle having an opening near one of its ends and a channel at the opposite end, and a valve operating lever having a projection on its under side extending into the opening in the guard of greater height than the normal distance of travel of the valve stem whereby the said operating lever is held in position in the guard, the other end of the valve operating lever extending into the channel whereby the operating lever is held in operative position with respect to said valve stem.

5. In combination with a nozzle, a valve in said nozzle having a stem extending out of the said nozzle, a guard on said nozzle having spaced projections adjacent one end thereof and a curved seat portion between said projections and having a channel at the opposite end thereof, and a valve operating lever having a curved cooperating surface to engage upon the seat portion of said guard with the opposite end extending into said channel whereby the operating lever is held in operative position in said guard by the valve stem.

6. In combination with a nozzle, a valve in said nozzle having a stem extending out of the said nozzle, a guard on said nozzle having spaced projections adjacent one end thereof and a curved seat portion between said projections and having a channel at the opposite end thereof, and a valve operating lever having a curved cooperating surface to engage upon the seat portion of said guard with the opposite end extending into said channel whereby the operating lever is held in operative position in said guard by the valve stem, the seat portion in the guard having a greater radius than the cooperating part in the operating lever.

7. In combination with a nozzle, a valve in said nozzle having a stem extending out of the said nozzle, a guard on said nozzle having spaced projections adjacent one end thereof and a curved seat portion between said projections and having a channel at the opposite end thereof, and a valve operating lever having a curved cooperating surface to engage upon the seat portion of said guard with the opposite end extending into said channel whereby the operating lever is held in operative position in said guard by the valve stem, the seat portion on the guard having a curvature of twice the radius of the cooperating part in the operating lever.

8. In combination with a nozzle, a valve in said nozzle having its stem extending out of the nozzle, a guard on said nozzle having an opening therein near one of its ends and a channel at its opposite end and having curved seats on each side of the said opening, and a valve operating lever having a projection in its under side at one of its ends with curved seats on each side of said projection adapted to engage the curved seats on the said guard, the other end of the valve operating lever extending into the channel in the guard whereby the operating lever is held in position in the guard, the radius of the curved contour of the seats on the valve operating lever being approximately one-half of the radius of the curved contour of the seat on the said guard.

CHRISTOPHER GROEN.